United States Patent [19]

Gual et al.

[11] Patent Number: 5,020,967
[45] Date of Patent: Jun. 4, 1991

[54] WIND MOTOR MODULE MADE BY ASSEMBLING A PARABOLIC-FLOW TURBINE BETWEEN A BASE AND A DOME

[76] Inventors: Dominique Gual; Georges Gual, both of F-30400 Villeneuve, Lez Avignon, France

[21] Appl. No.: 392,968
[22] PCT Filed: Nov. 30, 1988
[86] PCT No.: PCT/FR88/00586
 § 371 Date: Aug. 1, 1989
 § 102(e) Date: Aug. 1, 1989
[87] PCT Pub. No.: WO89/05403
 PCT Pub. Date: Jun. 15, 1989

[30] Foreign Application Priority Data
Dec. 4, 1987 [FR] France ................... 87 17256

[51] Int. Cl.$^5$ ............................................. F03D 1/04
[52] U.S. Cl. ................................................. 415/4.4
[58] Field of Search ............... 415/4.1, 4.2, 4.4, 905, 415/907; 290/55

[56] References Cited

U.S. PATENT DOCUMENTS

| 335,388 | 2/1886 | Serdinko | 415/4.1 |
|---|---|---|---|
| 1,519,447 | 12/1924 | Fortier-Beaulieu | 415/4.4 |
| 1,531,015 | 3/1925 | Maine | 415/4.2 |
| 4,047,834 | 9/1977 | Magoveny et al. | 290/55 |
| 4,162,410 | 7/1979 | Amick | 415/907 |
| 4,415,814 | 11/1983 | Martinez | 415/907 |
| 4,457,666 | 7/1984 | Selman, Jr. | 415/4.4 |

FOREIGN PATENT DOCUMENTS

| 577695 | 9/1924 | France | 415/4.2 |
|---|---|---|---|
| 727519 | 6/1932 | France | 415/4.2 |
| 2492897 | 4/1982 | France | 415/4.2 |
| 2509801 | 1/1983 | France . | |
| 2556783 | 6/1985 | France . | |
| 2624210 | 6/1989 | France . | |
| 224274 | 2/1943 | Switzerland | 415/4.2 |
| 192405 | 8/1923 | United Kingdom | 415/4.2 |

Primary Examiner—John T. Kwon
Attorney, Agent, or Firm—Cushman, Darby & Cushman

[57] ABSTRACT

A wind motor module which comprises three integrally cast elements, namely a parabolic flow turbine which rotates on a base and which is protected by a dome having the shape of a half-lens.

7 Claims, 1 Drawing Sheet

WIND MOTOR MODULE MADE BY ASSEMBLING A PARABOLIC-FLOW TURBINE BETWEEN A BASE AND A DOME

The invention relates to the design of a tri-monolithic wind motor module including a turbine wherein the laminar character of the air flow is aided by a parabolic trajectory based on appropriate redesigning.

In accordance with the state of the art and French Patent No. 2,509,801 and 2,556,783 relating to a wind motor module and a tri-functional turbine, all wind machines generate turbulences and vibrations which impair efficiency and reliability. Furthermore, machining and assembling a plurality of basic components considerably reduces the competitiveness of the product.

Figure 1:
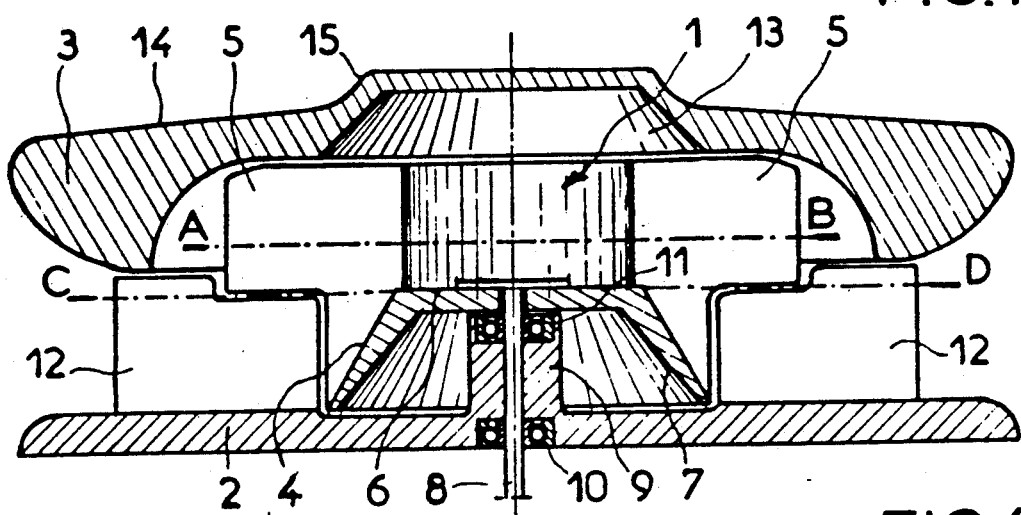
FIG. 1 is a cross-sectional view of the present invention.

It is an object of the present invention to remedy this state of affairs by means of a total redesign, characterized by combining in a single operation just three monolithic blocks comprising a turbine 1, a base 2 and a hemi-lenticular dome 3, FIG. 1 (vertical section).

Figure 2:
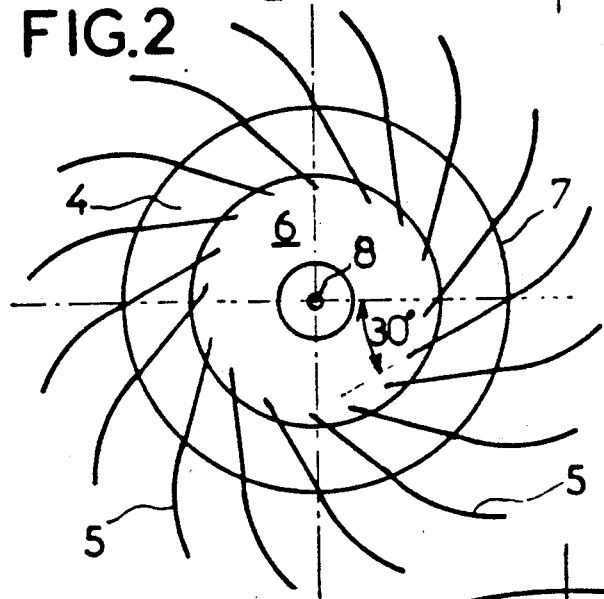
FIG. 2 is a sectional view taken along line A-B in FIG. 1.

Thus, the turbine 1, FIG. 2 (Section AB of FIG. 1) is comprised of a body 4 in the shape of a truncated cone joining together at the time of casting the peripheral assembly of vertical blades 5 which are uniformly distributed over the exterior surface.

Each one of these recti-curvilinear blades has a rectilinear portion extending beyond the exterior end of a curved portion. The rectilinear portion, extending outward from the exterior edge of the disk 6, forms an angle of 30° with the axis of the turning circle of the center 0. Said disk, of one piece with a skirt 7 of the truncated cone-shaped body is also of one piece, having at its center a central shaft 8. This shaft, arising from a subjacent base, can operate any working accessory.

But also, when the electrical function is desired, the interior portion of the truncated cone-shaped body can be equipped with a soft-iron ring, on which ferrites are glued facing windings wound on solid laminated armatures of a subjacent base.

Figure 3:
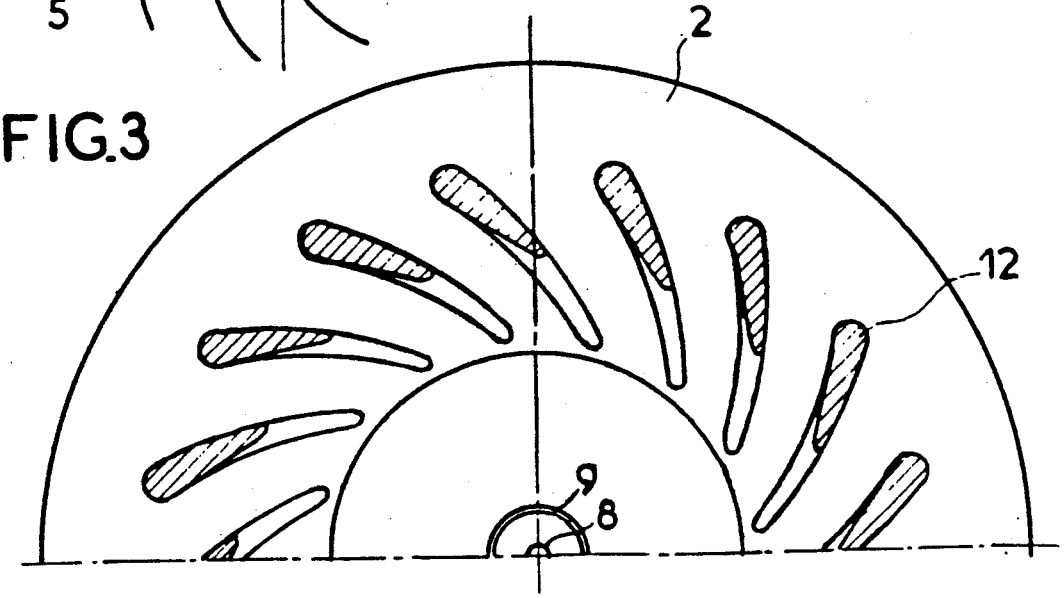
FIG. 3 is a sectional view taken along line C-D in FIG. 1.

The base 2, FIG. 3 (section CD of FIG. 1) has in its center an opening 9 with opposed abutments 10 and 11 in which the shaft of the turbine pivots. Furthermore, the base has around its periphery a series of vertical wings 12 which create not only engagement or escape channels but channel and direct the flow of air towards the extension of the curved end of each blade corresponding to the point of interaction a.

Thus, when the wings perform a movement action, the engagement channels, the blades and the skirt of the truncated cone-shaped body together, not separately, contribute to the movement effect but also to the creation of an internal rising flow which tangentially meets the truncated cone-shaped internal cavity 13 of the hemi-lenticular dome 3.

Figure 4:
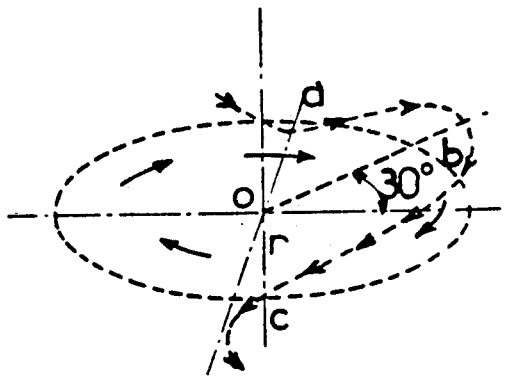
FIG. 4 illustrates the parabolic course imparted to the airflow by the device of FIG. 1.

This hemi-lenticular dome has on its internal cavity a convex section 13 of small spread and on its exterior surface a convex section 14 of large spread, surmounted by a protuberance 15, also in the shape of a truncated cone. This hemi-lenticular dome, placed over the turbine and the base, bends the air flow by imparting to it a descending curve. This air flow thus is bent near the top b of the rectilinear portion of the blades with an incidence of 20° to 30°, where it exerts a complimentary moving effect. Then the said flow continues by blowing against the curved parts of the blades from where it escapes in the inverse direction of the turbine having the effect of the reaction c. Consequently, during each revolution of the turbine, each one of the blades is subjected to three effects: a main action at the point of interaction a, a complementary action at the top b of said blades and an exit reaction c, according to the illustration of the parabolic course defined by FIG. 4, where the marking plane of the curve is inclined by 30° to the horizontal rotational plane of the turbine.

The advantages of such a tri-monolithic redesign of a wind motor module, including a parabolic turbine, lie in enhanced efficiency, reliability and competitiveness.

We claim:

1. A wind motor module that produces a parabolic laminar flow, comprising:
 a parabolic turbine having a centrally located vertical rotating shaft;
 a base on which said turbine turns, said base having vertical peripheral wings; and
 a dome for protecting the turbine and having a hemi-lenticular shape wherein said hemi-lenticular dome includes an interiorally disposed truncated cone shaped section.

2. A wind motor module according to claim 1, wherein, to generate said parabolic laminar flow, said turbine includes:
 a body shaped like a truncated cross-shaped cone having an upper disk integrally formed with a truncated cone shaped skirt; and
 a plurality of blades distributed vertically on exterior surfaces of said upper disk.

3. A wind motor module according to claim 2, wherein said vertical rotating shaft is centrally located in said upper disk, said vertical rotating shaft arising from a subjacent base.

4. A wind motor module according to claim 2, wherein each of said plurality of blades has an inner rectilinear portion with an outer curved portion, thereby enhancing a reaction effect.

5. A wind motor module according to claim 4, wherein the rectilinear portion extending from an outer edge of the disk towards an interior section of the disk makes an angle of 30° with an axis of a turning circle.

6. A wind motor module according to claim 1, wherein said base includes a centrally located journal bearing having opposing abutments.

7. A wind motor module according to claim 1, wherein said hemi-lenticular dome includes an exterior convex section with a centrally located truncated cone shaped proturbance.

* * * * *